United States Patent [19]

Mishima et al.

[11] Patent Number: 5,195,274

[45] Date of Patent: Mar. 23, 1993

[54] STRUCTURE FOR ATTACHING DOOR GLASS RUN

[75] Inventors: Kunio Mishima; Masahiro Nozaki, both of Inazawa, Japan

[73] Assignee: Toyoda Gosei Co., Ltd., Nishikasugai, Japan

[21] Appl. No.: 931,661

[22] Filed: Aug. 19, 1992

Related U.S. Application Data

[63] Continuation of Ser. No. 725,678, Jul. 3, 1991, abandoned.

[30] Foreign Application Priority Data

Jul. 4, 1990 [JP] Japan .................................. 2-177052

[51] Int. Cl.⁵ ............................................. E06B 7/22
[52] U.S. Cl. ........................................ 49/441; 49/479
[58] Field of Search ............. 49/489, 490, 440, 441, 49/475, 479, 488

[56] References Cited

U.S. PATENT DOCUMENTS

| | | | |
|---|---|---|---|
| 4,616,446 | 10/1986 | Okamoto | 49/374 X |
| 4,769,947 | 9/1988 | Ogawa et al. | 49/479 |
| 4,884,370 | 12/1989 | Nozaki et al. | 49/479 |
| 4,888,917 | 12/1989 | Mesnel et al. | 49/479 |
| 4,894,953 | 1/1990 | Nozaki | 49/440 |
| 4,894,954 | 1/1990 | Nozaki et al. | 49/479 |
| 4,908,989 | 3/1990 | Omura et al. | |
| 4,910,919 | 3/1990 | Kisanuki et al. | 49/441 X |
| 4,977,706 | 12/1990 | Kisanuki | 49/441 X |

FOREIGN PATENT DOCUMENTS

| | | | |
|---|---|---|---|
| 2646058 | 5/1977 | Fed. Rep. of Germany | 49/479 |
| 147921 | 9/1982 | Japan | 49/479 |
| 7714171 | 1/1980 | Sweden | 49/479 |

Primary Examiner—Renee S. Luebke
Assistant Examiner—Jerry Redman
Attorney, Agent, or Firm—Cushman, Darby & Cushman

[57] ABSTRACT

A structure for attaching a door glass run to a door frame of a motor vehicle, comprising a door frame having a substantially U-shaped cross-section, and a door glass run having a substantially U-shaped cross-section. The door glass run has an outwardly protruding stepped portion in its outer side wall along an end edge thereof. The stepped portion of a corner part of the door glass run rises in such a direction as to lap the end edge of the door frame, thereby forming a rising portion. When the door glass run is attached to the door frame, the stepped portion engages with the end edge of the door frame with the rising portion compressed by the end edge of a corner part of the door frame.

3 Claims, 3 Drawing Sheets

STRUCTURE FOR ATTACHING DOOR GLASS RUN

This is a continuation of application Ser. No. 07/725,678, filed on Jul. 3, 1991 now abandoned.

BACKGROUND OF THE INVENTION

1. Field of the Invention

The present invention relates to a door glass run to be attached to a door frame and, more particularly, to a structure for attaching a corner portion of the door glass run to the door frame.

2. Description of the Prior Art

As shown in FIG. 5, a door glass run 4 is attached along an inner periphery of a door frame 2 of a door 1 of a motor vehicle. The door glass run 4 guides a door glass 3 into its closed and open positions, and seals a periphery of the door glass 3 which is elevated into its fully closed position.

As shown in FIG. 6, the door glass run 4 is generally provided with a base portion 40 having a substantially U-shaped cross-section, outer and inner seal lips 41, 42 which are formed at both ends of the base portion 40 for holding both surfaces of the door glass 3, and a seal wall 46 which is pushed upwardly by an end edge of the door glass 3.

The door glass run 4 having the above-described constitution is attached to a channel-shaped door frame 2 having a substantially U-shaped cross-section.

In an outer side wall of the base portion 40, a stepped portion 411 which protrudes outwardly is continuously formed along an end edge of the outer lip 41.

Upon attaching, the stepped portion 411 abuts an end edge 21 of the door frame 2. However, in the corner portion of the door frame 2 which is encircled by the line A in FIG. 5, the door glass run 4 is likely to be attached in a state deviating from a predetermined position.

Furthermore, when the door glass 3 is lowered, the corner part of the door glass run 4 is likely to be pulled downwardly due to the sliding resistance between the door glass 3 and the door glass run 4.

Accordingly, the attached state of the door glass run 4 to the door frame 2 becomes unstable. This causes a gap S to be generated between the end edge 21 of the corner part of the door frame 2 and the stepped portion 411 of the door glass run 4, as shown in FIG. 6, thereby deteriorating good appearance around the corner part of the door frame 2, and decreasing the sealing properties of the door glass run 4.

SUMMARY OF THE INVENTION

It is an object of the present invention to provide a structure for attaching a door glass run to a door frame, which prevents a corner part of the door glass run from deviating from a predetermined position upon attaching of the door glass run, which prevents the door glass run from being pulled downwardly upon lowering of the door glass and which enables the stable attachment of the door glass run with good appearance.

In accordance with the present invention, the structure is composed of a door frame having a substantially U-shaped cross-section, and a door glass run having a substantially U-shaped cross-section. The door glass run is provided with a stepped portion in its outer side wall along an end edge thereof. The stepped portion protrudes outwardly and engages with an end edge of the door frame when the door glass run is attached to the door frame. The stepped portion of a corner part of the door glass run rises in such a direction as to lap the end edge of the door frame, thereby forming a rising portion. Upon attaching to the corner part of the door frame, the stepped portion of the corner part of the door glass run engages with the end edge of the corner part of the door frame with the rising portion of the stepped portion compressed by the end edge of the door frame.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
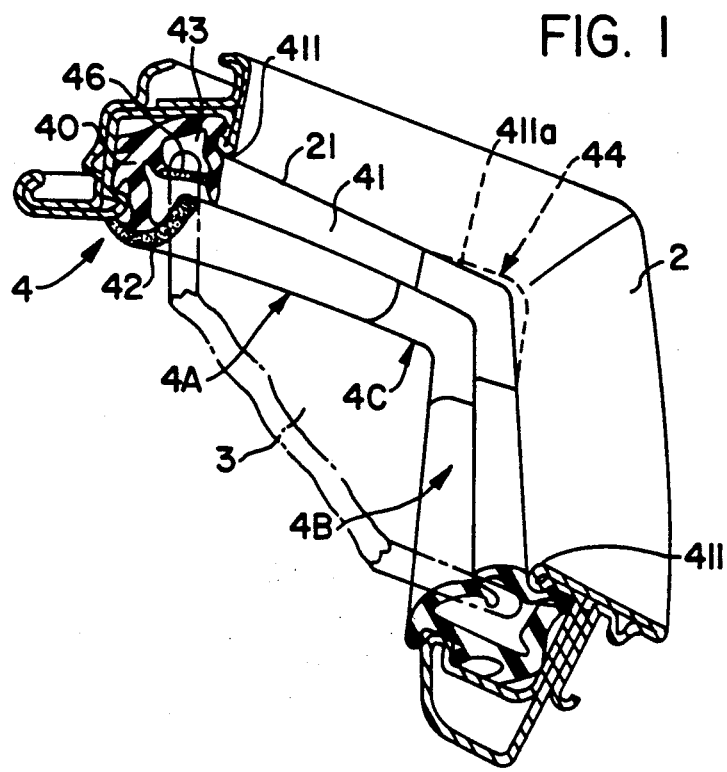
FIG. 1 is a perspective view of a first embodiment of a structure in accordance with the present invention, wherein a corner part of a door glass run is attached to a door frame.
Figure 2:
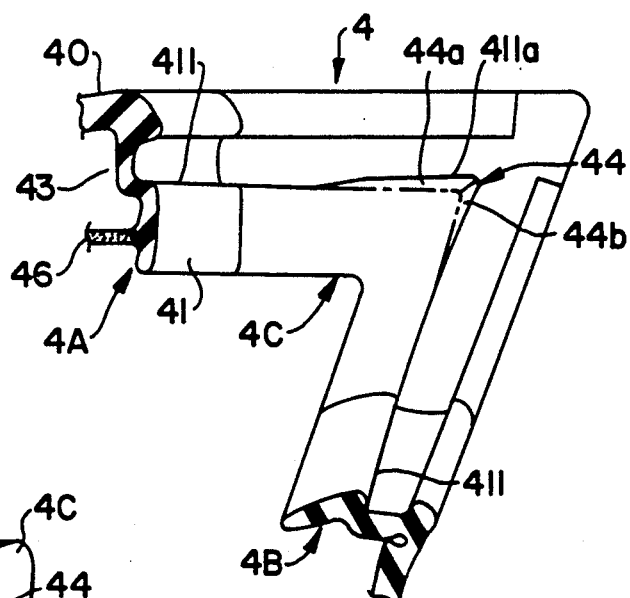
FIG. 2 is a perspective view of a corner part of the door glass run of the first embodiment.

In a first embodiment shown in FIGS. 1 and 2, a corner part of a door glass run 4 is composed of an extruded horizontal member 4A, an extruded vertical member 4B and a molded corner member 4C which connects respective ends of the extruded horizontal and vertical members 4A, 4B by molding. The door glass run 4 has a base portion 40 having a substantially U-shaped cross-section, and outer and inner seal lips 41, 42 formed at both ends of the base portion 40 for holding both surfaces of a door glass 3.

In the horizontal member 4A and a horizontal part of the molded corner member 4C, a tubular seal portion 43 is continuously formed. A seal wall 46 of the tubular seal portion 43 is pushed upwardly by an end edge of the door glass 3 which is elevated into its fully closed position.

The outer seal lip 41 has a striplike shape and is continuously formed in the horizontal member 4A, the molded corner member 4C and the vertical member 4B. In an outside surface of the outer seal lip 41, a stepped portion 411 is continuously formed along its root portion so as to protrude outwardly.

The door frame 2 takes a channel-like configuration having a substantially U-shaped cross-section. To the door frame 2, the door glass run 4 is attached so that the stepped portion 411 engages with an end edge 21 of the door frame 2.

As shown in FIGS. 1 and 2, particularly FIG. 2, in both the area from the horizontal member 4A to an end portion of the horizontal part of the molded corner member 4C, which is adjacent to the horizontal member 4A, and that from the vertical member 4B to an end portion of the vertical part of the molded corner member 4C, which is adjacent to the vertical member 4B, the stepped portion 411 extends straight in conformity to the facing end edge 21 of the door frame 2.

In the corner part of the molded corner member 4C, the stepped portion 411 gradually rises toward the center of the corner of the door glass run 4, as shown by line 411a in FIGS. 1 and 2.

In the horizontal part of the molded corner member 4C, a rising part 44a is integrally formed with the stepped portion 411 in such a direction as to lap the end edge 21 of the door frame 2. The height of the rising part 44a gradually increases toward the center of the corner of the molded corner member 4C.

In the vertical part of the molded corner member 4C, a rising part 44b of which the height gradually increases toward the center of the corner of the molded corner member 4C is formed. The rising part 44b continues to the rising part 44a at the center of the corner of the molded corner member 4C, thereby forming a rising portion 44.

The door glass run 4 having the above constitution is attached to the door frame 2 so that the stepped portion 411 of the horizontal and vertical members 4A, 4B abuts the end edge 21 of the door frame 2 while the rising portion 44a receives a pressing force from the end edge 21 of the horizonal part of the corner portion of the door frame 2. At the same time, the rising part 44b receives a pressing force from end edge 21 of the vertical part of the corner portion of the door frame 2. This results in rising parts 44a and 44b being compressed by and securely caught between the end edges 21 of the horizontal and vertical parts of the corner portion of the door frame 2. Consequently, the corner part of the molded corner member 4C is firmly engaged with the corner of the door frame 2.

Accordingly, the molded corner member 4C can be closely attached to the corner part of the door frame 2 with good work efficiency without deviating from a predetermined position. And the molded corner member 4C is prevented from being pulled downwardly with the lowering of the door glass 3.

Figure 6:
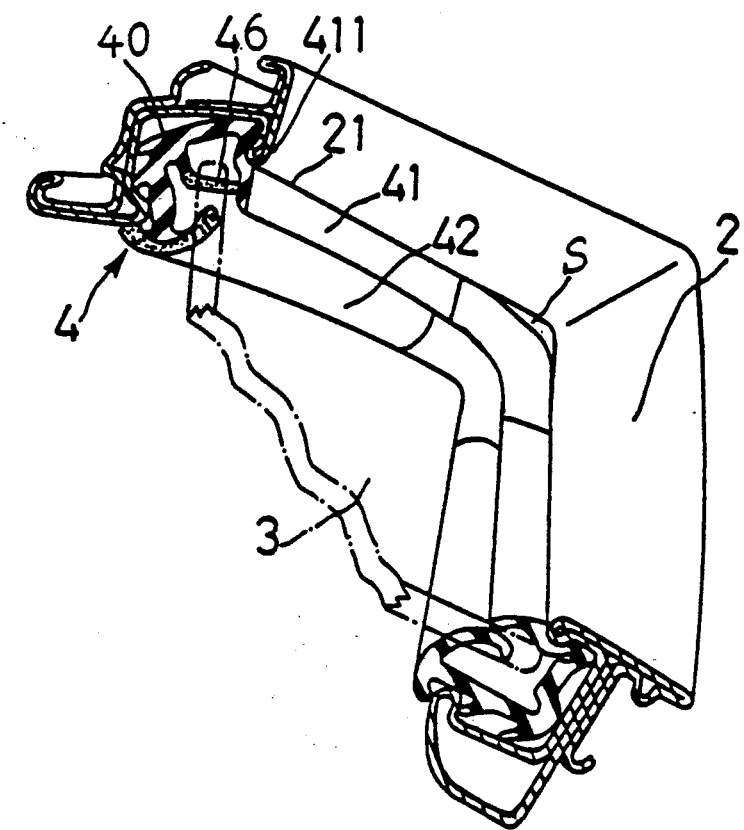
FIG. 6 is a perspective view of a conventional structure for attaching a corner part of a door glass run to a door frame.

Therefore, the gap S which has been encountered with the conventional structure, as shown in FIG. 6, can be prevented with the first embodiment.

Figure 3:
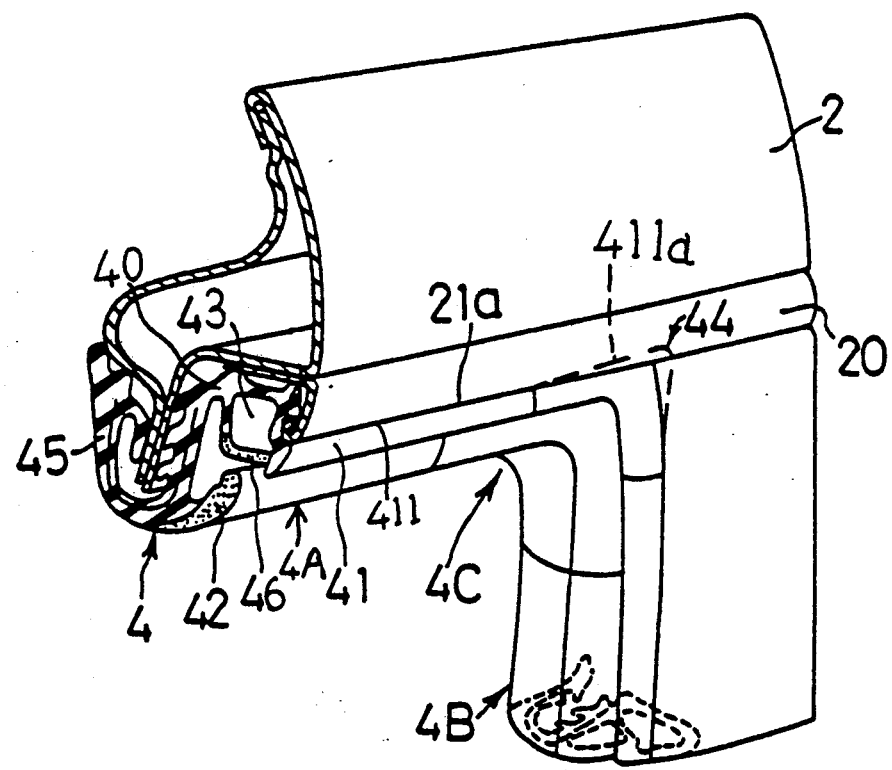
FIG. 3 is a perspective view of a second embodiment of the structure in accordance with the present invention.

FIG. 3 illustrates a second embodiment of the present invention.

With the second embodiment, the outer side wall of the horizontal part of the door frame 2 is composed of a door frame molding 20 which is separately formed from the main portion of the door frame 2. An end edge 21a of the molding 20 engages with the stepped portion 411 formed in the door glass run 4. The door glass run 4 is formed integrally with a trim 45 which is attached to a flange of the door frame 2.

The stepped portion 411 of the door glass run 4 having the above constitution is provided with a lap portion 44 in its corner part.

The second embodiment achieves the same operational effect as that of the first embodiment.

In FIG. 3, parts similar to those in FIG. 1 are given the same reference numerals as in FIG. 1.

Figure 4:
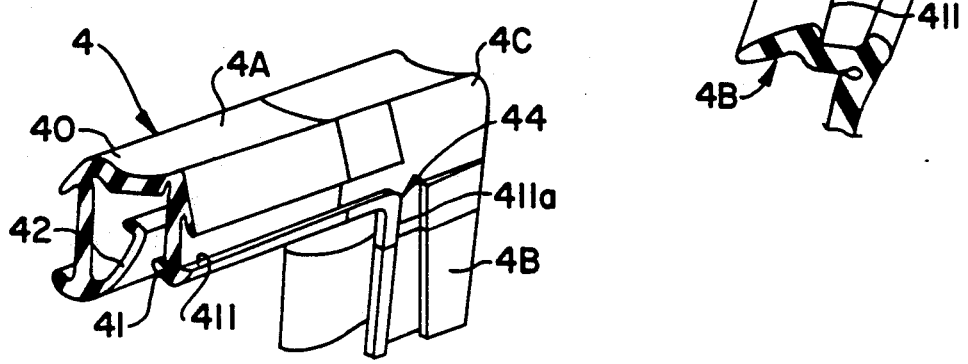
FIG. 4 is a perspective view of a corner part of the door glass run of a third embodiment of the structure in accordance with the present invention.

FIG. 4 illustrates a third embodiment of the present invention.

With the third embodiment, the seal lip 41 of the door glass run 4 projects obliquely inwardly from an end of the outer side wall of the base portion 40. The stepped portion 411 is formed along and near the end of the outer side wall of the base portion 40 so as to protrude outwardly. The stepped portion 411 is provided with a rising portion 44 in its corner part. The glass run 4 of the present embodiment has no tubular seal portion 43 as shown in FIG. 1.

The remainder of the structure of the third embodiment is identical to that of the first embodiment shown in FIG. 1, and the third embodiment achieves the same operational effect as that of the first embodiemnt.

Figure 5:
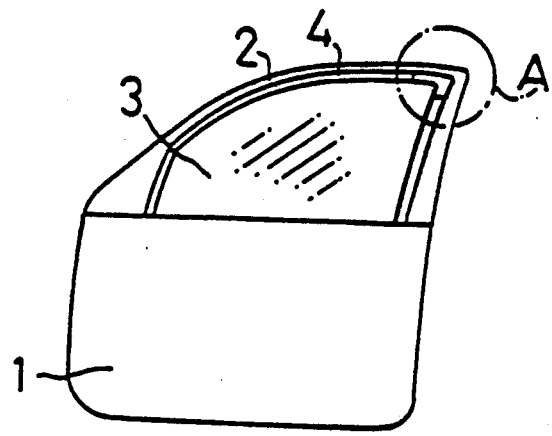
FIG. 5 is a front view of a door to which the door glass run is attached.

The present invention can be applied to not only the corner portion encircled by the line A in FIG. 5 but also other molded corner portions of the door glass run.

What is claimed is:

1. A structure for attaching a door glass run to door frame of a motor vehicle, comprising:

a door frame having a substantially U-shaped cross-section, said door frame including a corner part; and a door glass run having a substantially U-shaped cross-section, said door glass run being provided with a stepped portion in an outer side wall along an end edge thereof, said stepped portion protruding outwardly, said stepped portion having a lateral portion and a vertical portion, said lateral portion and said vertical portion being joined by a corner portion, said corner portion being composed of a lateral rising part and a vertical rising part which continue toward each other to a center of a corner of said corner portion, said lateral rising part gradually rising along a lateral outer edge of said corner portion in a direction along said outer side wall of said door glass run, and said vertical rising part gradually rising along a vertical outer edge of said corner portion in a direction along said outer side wall of said door glass run, so as to form a corner rising portion, said stepped portion engaging with an end edge of said door frame with said corner rising portion being engaged with and compressed by said end edge of said corner part of said door frame when said door glass run is attached to said door frame.

2. The structure according to claim 1, wherein said door glass run further comprises at least two extruded members and at least one molded corner member for connecting ends of said two extruded members to each other, which composes a corner part of said door glass run.

3. The structure according to claim 2, wherein said outer side wall of said door glass run has a seal lip which projects obliquely inwardly from an end thereof, and said stepped portion is formed in said outer side wall along and near said end so as to protrude outwardly.

* * * * *